US011259198B2

(12) United States Patent
Rosier

(10) Patent No.: US 11,259,198 B2
(45) Date of Patent: Feb. 22, 2022

(54) SYSTEM AND METHOD FOR PREDICTION OF NETWORK QUALITY

(71) Applicant: Rohde & Schwarz GmbH & Co. KG, Munich (DE)

(72) Inventor: Holger Rosier, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/827,715

(22) Filed: Nov. 30, 2017

(65) Prior Publication Data

US 2018/0288644 A1 Oct. 4, 2018

(30) Foreign Application Priority Data

Mar. 29, 2017 (EP) ..................................... 17163490

(51) Int. Cl.
| | | |
|---|---|---|
| *H04W 24/10* | (2009.01) | |
| *H04B 17/373* | (2015.01) | |
| *H04L 25/02* | (2006.01) | |
| *H04L 12/24* | (2006.01) | |
| *H04L 12/26* | (2006.01) | |
| *H04W 24/08* | (2009.01) | |
| *H04B 17/309* | (2015.01) | |
| *H04W 24/02* | (2009.01) | |
| *H04W 64/00* | (2009.01) | |
| *H04L 41/147* | (2022.01) | |
| *H04L 43/0852* | (2022.01) | |

(52) U.S. Cl.
CPC .......... *H04W 24/10* (2013.01); *H04B 17/373* (2015.01); *H04L 25/0202* (2013.01); *H04L 41/147* (2013.01); *H04L 43/0852* (2013.01); *H04B 17/309* (2015.01); *H04W 24/02* (2013.01); *H04W 24/08* (2013.01); *H04W 64/003* (2013.01)

(58) Field of Classification Search
CPC ..... H04W 24/00; H04W 24/02; H04W 24/04; H04W 24/08; H04W 24/10; H04W 64/003; H04L 43/04; H04L 43/08; H04L 43/0852; H04L 43/0829; H04L 25/0202; H04L 65/80; H04L 41/147; H04B 17/309; H04B 17/318; H04B 17/373
See application file for complete search history.

(56) References Cited

U.S. PATENT DOCUMENTS

| | | | |
|---|---|---|---|
| 2011/0312312 A1* | 12/2011 | Astrom | G01S 5/021 455/418 |
| 2013/0073506 A1* | 3/2013 | Camp | G05B 13/00 706/46 |
| 2015/0163047 A1 | 6/2015 | Zhang | |
| 2017/0230844 A1* | 8/2017 | Li | H04L 43/16 |
| 2017/0267252 A1* | 9/2017 | Park | B60W 50/087 |
| 2018/0139638 A1* | 5/2018 | Baer | H04L 41/5067 |
| 2019/0028231 A1* | 1/2019 | Wang | H04W 28/0252 |

* cited by examiner

*Primary Examiner* — Peter Chen
(74) *Attorney, Agent, or Firm* — Ditthavong, Steiner & Mlotkowski

(57) ABSTRACT

A system for prediction of network quality in a wireless network. The system comprises at least one mobile communication device, at least one data prediction unit and a data collection unit. Furthermore, the at least one mobile communication device measures the network quality and transmits the measured network quality to the data collection unit. In addition to this, the at least one data prediction unit calculates prediction data with respect to the network quality based on data from the data collection unit.

15 Claims, 3 Drawing Sheets

SYSTEM AND METHOD FOR PREDICTION OF NETWORK QUALITY

PRIORITY

This application claims priority of European patent application EP 17 163 490.0 filed on Mar. 29, 2017, which is incorporated by reference herewith.

FIELD OF THE INVENTION

The invention relates to a system and a method for prediction of network quality, especially for prediction of network quality in a wireless network.

BACKGROUND OF THE INVENTION

Generally, in times of an increasing number of communication applications, especially of wireless communication applications, there is a growing need of systems and methods guaranteeing a high quality of service.

US 2005/0163047 A1 discloses a method and an apparatus for monitoring quality of service of wireless mobile devices. However, in accordance with said document, quality of service, and thus network quality, can just be monitored. This disadvantageously leads to the fact that errors in data transmission cannot be avoided because a defective communication channel can only be detected after or during data transmission.

Accordingly, there is an object to provide a system and a method for prediction of network quality especially in wireless networks in order to avoid the usage of a defective communication channel for data transmission, and thus to allow for prevention of data transfer errors.

SUMMARY OF THE INVENTION

According to a first aspect of the invention, a system for prediction of network quality in a wireless network is provided. The system comprises at least one mobile communication device, at least one data prediction unit, and a data collection unit. Furthermore, the at least one mobile communication device measures the network quality and transmits the measured network quality to the data collection unit. In addition to this, the at least one data prediction unit calculates prediction data with respect to the network quality based on data from the data collection unit.

According to a first preferred implementation form of the first aspect, the at least one mobile communication device receives the prediction data with respect to the network quality from the at least one data prediction unit. Additionally or alternatively, at least one mobile communication device comprises at least one data prediction unit.

According to a further preferred implementation form of the first aspect, at least one mobile communication device comprises at least one local data collection unit for a decentralized data collection. In this context, the at least one data prediction unit calculates prediction data with respect to the network quality based on data from the at least one local data collection unit. Additionally or alternatively, the at least one data prediction unit calculates prediction data with respect to the network quality based on data from the data collection unit.

According to a further preferred implementation form of the first aspect, data with respect to the network quality measured by the at least one mobile communication device especially comprises delay or throughput or positon of the at least one mobile communication device or jitter or a combination thereof.

According to a further preferred implementation form of the first aspect, the at least one mobile communication device measures environment data with respect to the environment of the at least one mobile communication device. In this context, the environment data especially comprises temperature or number of mobile communication devices in one network or distance to other mobile communication devices or a combination thereof.

According to a further preferred implementation form of the first aspect, the at least one mobile communication device receives data from the at least one data prediction unit for at least one predefined position of the mobile communication devices.

According to a further preferred implementation form of the first aspect, the at least one mobile communication device receives data from the at least one data prediction unit for at least one predefined distance to other mobile communication devices.

According to a further preferred implementation form of the first aspect, the at least one mobile communication device comprises a communication processing unit for processing communication data. In this context, the communication processing unit especially processes communication data based on prediction data.

According to a further preferred implementation form of the first aspect, the at least one data prediction unit calculates the prediction data based on experience values.

According to a further preferred implementation form of the first aspect, the data collection unit saves data with respect to network quality from at least two mobile communication devices.

According to a further preferred implementation form of the first aspect, the at least one mobile communication device is movable.

According to a further preferred implementation form of the first aspect, the at least one data prediction unit comprises a data processing unit for processing data, especially data with respect to a large data volume or high complexity or a combination thereof.

According to a further preferred implementation form of the first aspect, the at least one data prediction unit comprises a pattern matching unit. In this context, the pattern matching unit especially compares an actual data pattern of the at least mobile communication device with former data patterns.

According to a second aspect of the invention, a method for prediction of network quality in a wireless network is provided. The method comprises the steps of measuring the network quality with respect to at least one mobile communication device and transmitting the measured network quality to a data collection unit, and calculating prediction data with respect to the network quality based on data from the data collection unit with the aid of at least one data prediction unit.

According to a preferred implementation form of the second aspect, the method further comprises at least one of the steps of receiving the prediction data with respect to the network quality from the at least one data prediction unit with the aid of the at least one mobile communication device, and additionally or alternatively, comparing an actual data pattern of the at least mobile communication device with former data patterns with the aid of a pattern matching unit of the at least one data prediction unit.

BRIEF DESCRIPTION OF THE DRAWINGS

Exemplary embodiments of the invention are now further explained with respect to the drawings by way of example only, and not for limitation. In the drawings.

DETAILED DESCRIPTION OF PREFERRED EMBODIMENTS

Figure 1:
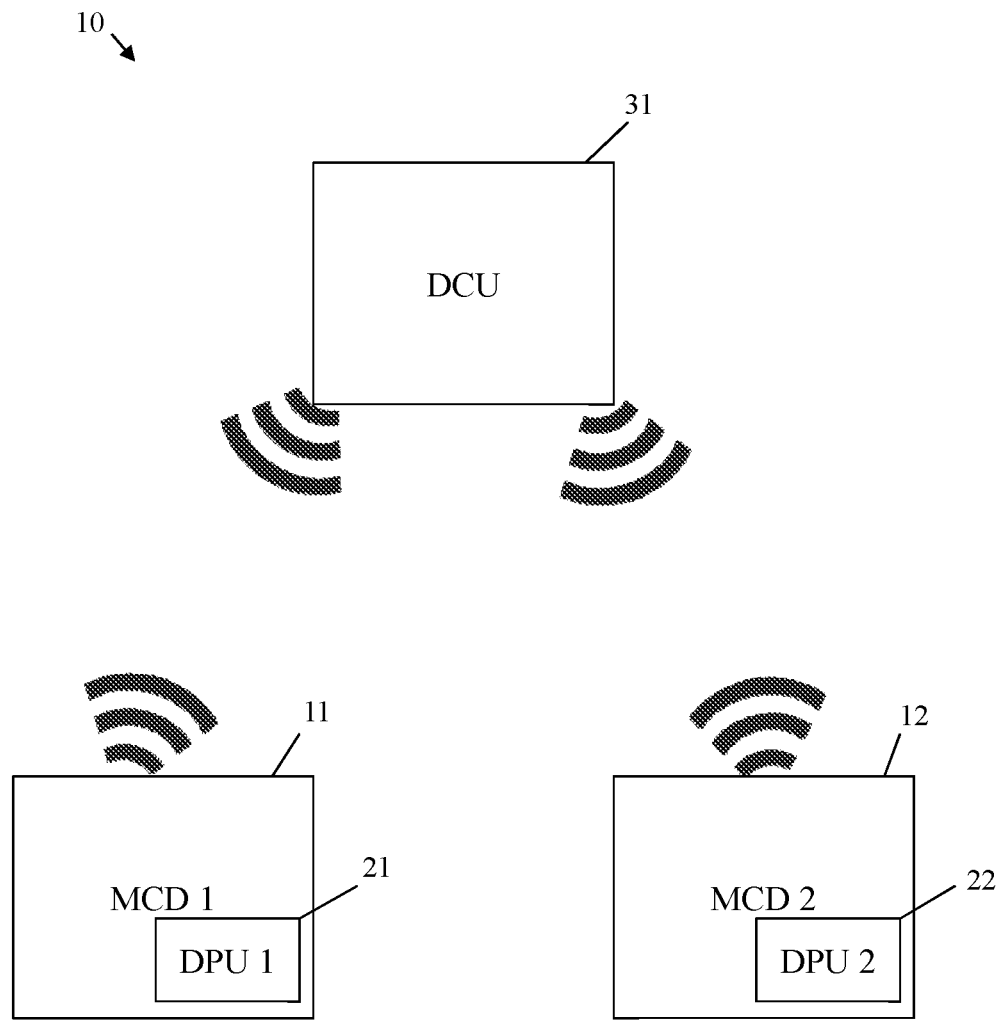
FIG. 1 shows a block diagram of an exemplary embodiment of an inventive system for prediction of network quality.

With respect to FIG. 1, a block diagram of an exemplary embodiment of a system 10 for prediction of network quality in a wireless network is shown.

According to FIG. 1, each of a first mobile communication device 11 comprising a first data prediction unit 21 and a second mobile communication device 12 comprising a second data prediction unit 22 communicates with a data collection unit 31.

Furthermore, each of the first and the second mobile communication device 11, 12 measures the network quality and transmits the measured network quality to the data collection unit 31.

In this context, the measured data may preferably also comprise data with respect to delay, throughput, position of the respective mobile communication device 11, 12, jitter, or any combination thereof.

In addition to this, each of the first and the second mobile communication device 11, 12 may preferably measure environment data with respect to the environment of the respective mobile communication device 11, 12. In this context, environment data may especially comprise data with respect to temperature, number—evidently two in this exemplary case—of mobile communication devices in the network, distance to other mobile communication devices, or any combination thereof.

Moreover, each of the first and the second data prediction unit 21, 22 calculates prediction data with respect to the network quality based on data from the data collection unit 31. In this context, the respective information regarding calculated prediction data with respect to network quality with the aid of the first and the second data prediction unit 21, 22 is passed to the corresponding mobile communication device 11, 12.

Additionally, each of the first and the second mobile communication device 11, 21 may preferably process communication data based on prediction data.

Advantageously, the respective communication channel may preferably be used by the first or the second mobile communication device 11, 12 based on prediction data. In this manner, data transfer error can be avoided.

It should further be mentioned that each of the first and the second data prediction unit 21, 22 may preferably calculate the prediction data based on experience values.

Figure 2:
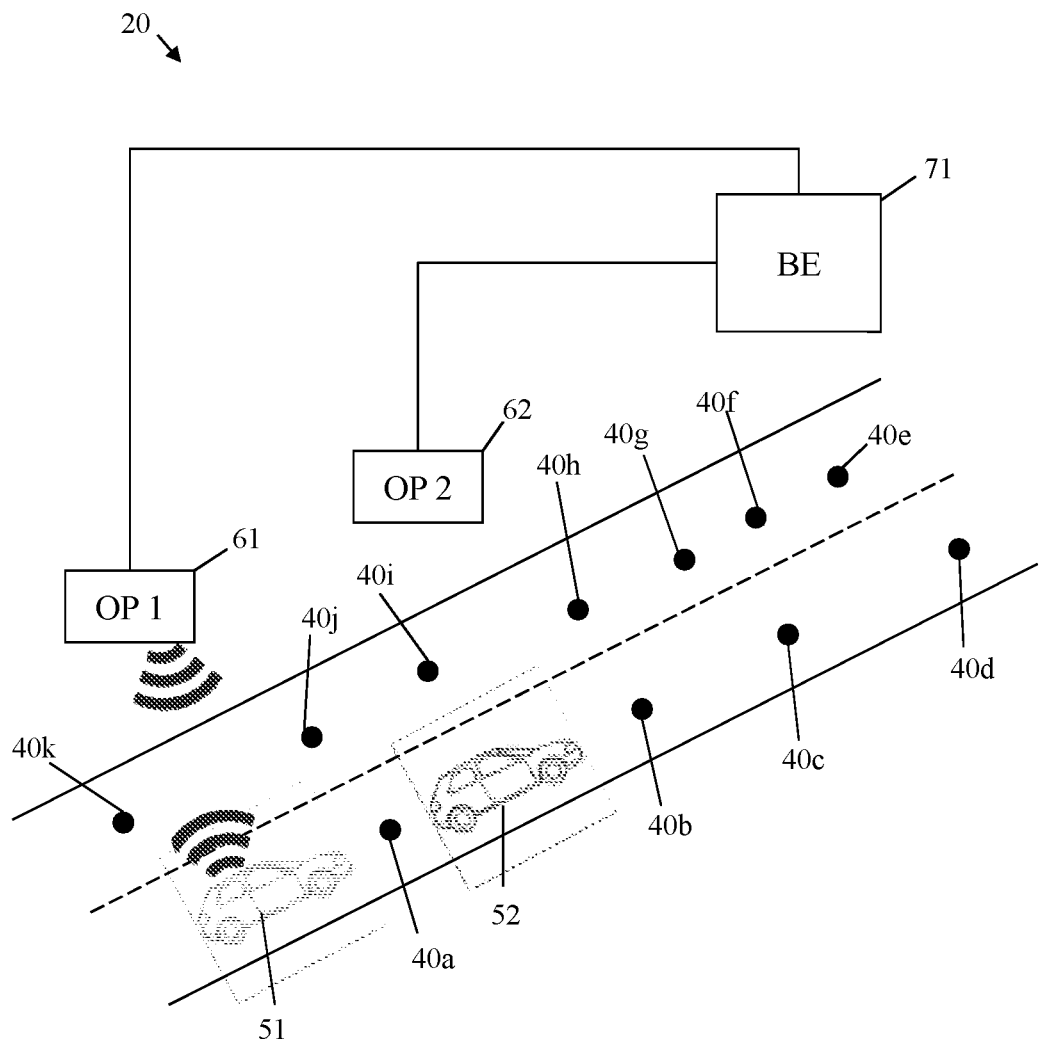
FIG. 2 shows an exemplary usage of an exemplary embodiment of an inventive system in connection with advanced driver assistance systems.

Now, FIG. 2 illustrates an exemplary usage of an exemplary embodiment 20 of an inventive system in connection with advanced driver assistance systems (ADAS).

According to FIG. 2, a first car 51 and a second car 52 drive on a road. Furthermore, one can see a first operator 61 and a second operator 62, each of which is connected to a backend 71. In addition to this, the first car 51 wirelessly communicates with the first operator 61.

In this context, the first car 51 may especially request statistics with special respect to network quality from the first operator 61 in order to plan a maneuver such as over-taking in a safest manner without data transfer errors of the ADAS of the first car 51. Afterwards, the first operator 61 provides the respective statistics. These statistics, especially statistics regarding network quality, are preferably prepared by the backend 71. For this purpose, cars employing an ADAS measure the network quality and transmit the measured network quality to the backend 71 which preferably gathers all measurements.

Such a measurement may preferably comprise information with respect to location of the respective car, time, and network quality, which is illustrated in FIG. 2 with the aid of exemplary measurement points 40a to 40k from other cars and vehicles.

In addition to this, the network quality may preferably comprise experienced latency, signal-to-noise ratio, signal receive power, handover duration, or any combination thereof.

Furthermore, it should be mentioned that in the context of FIG. 2, each of the first car 51 and the second car 52 can especially be seen as a kind of mobile communication device 11, 12 according to FIG. 1. Additionally, whereas each of the first the second operator 61, 62 can especially be seen as a kind of data prediction unit 21, 22, the backend 71 can especially be seen as a kind of data collection unit 31.

Figure 3:
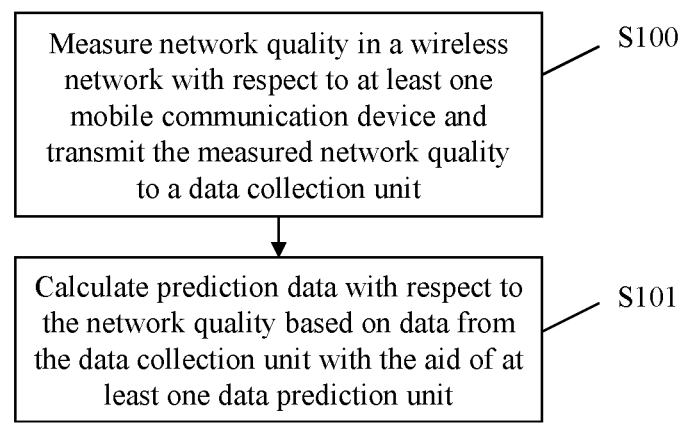
FIG. 3 shows a flow chart of an embodiment of the second aspect of the invention.

Finally, FIG. 3 shows a flow chart of an embodiment of the inventive method. In a first step S100, network quality in a wireless network is measured with respect to at least one mobile communication device and the measured network quality is transmitted to a data collection unit. Then, in a second step S101, prediction data with respect to the network quality is calculated based on data from the data collection unit with the aid of at least one data prediction unit.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A system for prediction of network quality in a wireless network, the system comprising:
   at least one mobile communication device,
   at least one data prediction circuit,
   a data collection circuit,
   wherein the at least one mobile communication device measures the network quality and transmits the measured network quality to the data collection circuit,
   wherein the at least one data prediction circuit calculates prediction data with respect to the network quality based on data from the data collection circuit,
   wherein the at least one mobile communication device comprises the at least one data prediction circuit and communicates with the data collection circuit,
   wherein the network quality comprises signal receive power,
   wherein the at least one mobile communication device processes communication data based on the prediction data,
   wherein the data collection circuit comprises a backend of an advanced driver assistance system,
   wherein the at least one mobile communication device measures environment data with respect to the environment of the least one mobile communication device, wherein the environment data comprises at least a temperature of the at least one mobile communication device, and a number of mobile communication devices in one network, and
   wherein the environment data is used to predict the network quality.

2. The system according to claim 1,
   wherein the at least one mobile communication device receives the prediction data with respect to the network quality from the at least one data prediction circuit, or
   wherein the at least one mobile communication device comprises the at least one data prediction circuit.

3. The system according to claim 1,
   wherein the at least one mobile communication device comprises at least one local data collection circuit for a decentralized data collection, wherein the at least one data prediction circuit calculates the prediction data with respect to the network quality based on the data from the at least one local data collection circuit or from the data collection circuit.

4. The system according to claim 1,
   wherein the data with respect to the network quality measured by the at least one mobile communication device comprises delay or throughput or position of the at least one mobile communication device or jitter or a combination thereof.

5. The system according to claim 1,
   wherein the at least one mobile communication device measures environment data with respect to the environment of the at least one mobile communication device, wherein the environment data further comprises a distance to other mobile communication devices.

6. The system according to claim 1,
   wherein the at least one mobile communication device receives data from the data prediction circuit for at least one predefined position of the mobile communication devices.

7. The system according to claim 1,
   wherein the at least one mobile communication device receives data from the data prediction circuit for at least one predefined distance to other mobile communication devices.

8. The system according to claim 1,
   wherein the at least one mobile communication device comprises a communication processing circuit for processing communication data, wherein the communication processing circuit processes communication data based on the prediction data.

9. The system according to claim 1,
   wherein the at least one data prediction circuit calculates the prediction data based on experience values.

10. The system according to claim 1,
    wherein the data collection circuit saves the data with respect to the network quality from at least two mobile communication devices.

11. The system according to claim 1,
    wherein the at least one mobile communication device is movable.

12. The system according to claim 1,
    wherein the at least one data prediction circuit comprises a data processing circuit for processing data, wherein the data comprises a large data volume or high complexity or a combination thereof.

13. The system according to claim 1,
    wherein the at least one data prediction circuit comprises a pattern matching circuit, wherein the pattern matching circuit compares an actual data pattern of the at least one mobile communication device with former data patterns.

14. A method for prediction of network quality in a wireless network, the method comprises the steps of:
    measuring the network quality with respect to at least one mobile communication device and transmitting the measured network quality to a data collection circuit,
    calculating prediction data with respect to the network quality based on data from the data collection circuit with the aid of at least one data prediction circuit, and
    processing the data based on the prediction data with the at least one mobile communication device,
    wherein the at least one mobile communication device comprises the at least one data prediction circuit and communicates with the data collection circuit,
    wherein the network quality comprises signal receive power,
    wherein the data collection circuit comprises a backend of an advanced driver assistance system,
    wherein the at least one mobile communication device measures environment data with respect to the environment of the least one mobile communication device, wherein the environment data comprises at least a temperature of the at least one mobile communication device, and a number of mobile communication devices in one network, and wherein the environment data is used to predict the network quality.

15. The method according to claim 14,
wherein the method further comprises at least one of the steps of:
- receiving the prediction data with respect to the network quality from the at least one data prediction circuit with the aid of the at least one mobile communication device, or
- comparing an actual data pattern of the at least one mobile communication device with former data patterns with the aid of a pattern matching circuit of the at least one data prediction circuit.

* * * * *